United States Patent
Black

(10) Patent No.: US 9,132,735 B2
(45) Date of Patent: Sep. 15, 2015

(54) ELECTRIC CAR SYSTEMS

(76) Inventor: George Black, Olathe, KS (US)

( * ) Notice: Subject to any disclaimer, the term of this patent is extended or adjusted under 35 U.S.C. 154(b) by 686 days.

(21) Appl. No.: 13/291,174

(22) Filed: Nov. 8, 2011

(65) Prior Publication Data

US 2012/0211291 A1 Aug. 23, 2012

Related U.S. Application Data

(60) Provisional application No. 61/507,730, filed on Jul. 14, 2011.

(51) Int. Cl.
*B60L 11/18* (2006.01)
*B60L 7/10* (2006.01)
*B60L 8/00* (2006.01)

(52) U.S. Cl.
CPC ... *B60L 7/10* (2013.01); *B60L 8/00* (2013.01); *B60L 11/1868* (2013.01); *Y02T 10/7005* (2013.01); *Y02T 10/7066* (2013.01); *Y02T 10/7083* (2013.01)

(58) Field of Classification Search
CPC ........... Y02T 10/7005; Y02T 10/6265; Y02T 10/7077; B60K 6/52; B60K 17/356
USPC .......... 180/65.1, 291, 65.22, 65.265, 65.275, 180/65.285, 65.29, 65.31
See application file for complete search history.

(56) References Cited

U.S. PATENT DOCUMENTS

| | | | |
|---|---|---|---|
| 3,190,387 A * | 6/1965 | Dow | 180/65.1 |
| 3,367,438 A * | 2/1968 | Moore | 180/65.23 |
| 3,424,261 A * | 1/1969 | Sheldon | 180/69.6 |
| 3,444,946 A | 5/1969 | Waterbury et al. | |
| 3,499,163 A * | 3/1970 | Verreault | 290/16 |
| 3,517,766 A * | 6/1970 | West | 180/65.245 |
| 3,530,356 A * | 9/1970 | Aronson | 320/117 |
| 3,603,853 A * | 9/1971 | Mackay | 318/146 |
| 3,861,487 A * | 1/1975 | Gill | 180/65.31 |
| 3,899,041 A * | 8/1975 | Mager | 180/65.8 |
| 3,915,251 A * | 10/1975 | Kassekert et al. | 180/65.1 |
| 3,972,380 A * | 8/1976 | Hudson et al. | 180/65.25 |
| 4,024,926 A * | 5/1977 | Butoi | 180/65.245 |
| 4,095,664 A * | 6/1978 | Bray | 180/65.245 |
| 4,222,450 A * | 9/1980 | Fobbs | 180/65.31 |
| 4,235,300 A * | 11/1980 | Capjon | 180/254 |
| 4,254,843 A * | 3/1981 | Han et al. | 180/165 |
| 4,298,082 A * | 11/1981 | Ramos | 180/65.8 |
| 4,347,473 A * | 8/1982 | Stroud | 320/126 |
| 4,348,628 A * | 9/1982 | Loucks | 320/124 |
| 4,381,041 A * | 4/1983 | Butoi | 180/65.31 |

(Continued)

*Primary Examiner* — Brodie Follman
(74) *Attorney, Agent, or Firm* — RG Patent Consulting, LLC; Rachel Gilboy

(57) ABSTRACT

An electric car system for use in transporting users from one location to another at speeds of up to 70 MPH. Electric car system comprises a frame, a steering system, a braking system, a suspension system, and a body. An electronic drive system controller is located near the operator's controls comprising a touch screen for selecting forward, reverse, and security movement lock position(s). The drive assembly comprises at least one accessory battery charged by an accessory alternator, at least one drive assembly battery charged by a drive assembly alternator, and an electric drive motor. The accessory battery powers car accessories and provides redundant electricity to the drive assembly battery when needed. The drive assembly battery provides power to the electric drive motor. The electric drive motor provides torque to two half shafts which couple to front axles and front rotatable wheels in front-wheel drive versions.

18 Claims, 5 Drawing Sheets

(56) References Cited

U.S. PATENT DOCUMENTS

| | | | | |
|---|---|---|---|---|
| 4,405,028 A | * | 9/1983 | Price | 180/65.7 |
| 4,413,698 A | * | 11/1983 | Conrad et al. | 180/305 |
| 4,438,342 A | * | 3/1984 | Kenyon | 290/45 |
| 4,602,694 A | * | 7/1986 | Weldin | 180/2.2 |
| 4,604,565 A | * | 8/1986 | Yokota et al. | 320/123 |
| 4,689,531 A | * | 8/1987 | Bacon | 318/139 |
| 4,757,249 A | * | 7/1988 | Farber et al. | 320/126 |
| 4,928,227 A | * | 5/1990 | Burba et al. | 701/66 |
| 5,097,194 A | * | 3/1992 | Walton et al. | 320/128 |
| 5,125,469 A | * | 6/1992 | Scott | 180/65.25 |
| 5,215,156 A | * | 6/1993 | Stulbach et al. | 180/65.31 |
| 5,224,563 A | * | 7/1993 | Iizuka et al. | 180/65.21 |
| 5,336,932 A | * | 8/1994 | Barske | 290/1 R |
| 5,488,283 A | * | 1/1996 | Dougherty et al. | 307/10.1 |
| 5,635,805 A | * | 6/1997 | Ibaraki et al. | 318/139 |
| 5,667,029 A | * | 9/1997 | Urban et al. | 180/65.23 |
| 5,680,908 A | * | 10/1997 | Reed | 180/65.245 |
| 5,689,174 A | * | 11/1997 | Pacheco, Sr. | 322/16 |
| 5,704,440 A | * | 1/1998 | Urban et al. | 180/65.23 |
| 5,755,303 A | * | 5/1998 | Yamamoto et al. | 180/65.25 |
| 5,986,416 A | * | 11/1999 | Dubois | 318/139 |
| 6,044,923 A | * | 4/2000 | Reagan et al. | 180/65.265 |
| 6,082,476 A | * | 7/2000 | Stulbach | 180/65.25 |
| 6,201,310 B1 | * | 3/2001 | Adachi et al. | 290/4 C |
| 6,220,380 B1 | * | 4/2001 | Mita et al. | 180/65.1 |
| 6,253,131 B1 | * | 6/2001 | Quigley et al. | 701/36 |
| 6,332,504 B1 | * | 12/2001 | Adds | 180/65.25 |
| 6,598,691 B2 | * | 7/2003 | Mita et al. | 180/65.1 |
| 6,633,800 B1 | * | 10/2003 | Ward et al. | 701/2 |
| 6,661,109 B2 | * | 12/2003 | Fukasaku et al. | 290/40 C |
| 6,796,398 B1 | * | 9/2004 | DeGevay | 180/311 |
| 6,828,691 B2 | * | 12/2004 | Tu et al. | 290/40 C |
| 6,914,341 B1 | * | 7/2005 | McIntyre | 290/9 |
| 6,965,173 B2 | * | 11/2005 | Fukasaku et al. | 290/40 C |
| 7,028,791 B2 | * | 4/2006 | Chernoff et al. | 180/65.1 |
| 7,044,255 B2 | * | 5/2006 | Maeda et al. | 180/242 |
| 7,108,095 B1 | * | 9/2006 | Washington et al. | 180/165 |
| 7,134,517 B1 | * | 11/2006 | Kaiser et al. | 180/65.6 |
| 7,183,746 B1 | * | 2/2007 | Carter | 320/116 |
| 7,258,395 B2 | * | 8/2007 | Bataille et al. | 296/203.01 |
| 7,271,555 B1 | * | 9/2007 | Ciccone | 318/139 |
| 7,279,855 B2 | * | 10/2007 | Tahara et al. | 318/46 |
| 7,293,621 B2 | * | 11/2007 | Long | 180/165 |
| 7,335,998 B2 | * | 2/2008 | Wolf | 290/10 |
| 7,374,000 B2 | * | 5/2008 | Yamamoto et al. | 180/65.285 |
| 7,566,991 B2 | * | 7/2009 | Blackman | 307/65 |
| 7,748,488 B2 | * | 7/2010 | Tarasinski et al. | 180/242 |
| 8,072,092 B2 | * | 12/2011 | Patterson | 307/9.1 |
| 8,104,560 B1 | * | 1/2012 | Huang | 180/165 |
| 8,162,096 B2 | * | 4/2012 | Gagnon et al. | 180/446 |
| 8,182,393 B2 | * | 5/2012 | Gillingham et al. | 477/8 |
| 8,292,770 B2 | * | 10/2012 | Novikov | 475/5 |
| 8,403,088 B2 | * | 3/2013 | Knoblauch et al. | 180/65.7 |
| 8,439,140 B1 | * | 5/2013 | Amortegui et al. | 180/65.51 |
| 8,469,133 B2 | * | 6/2013 | Kaiser et al. | 180/248 |
| 8,483,897 B2 | * | 7/2013 | Marus et al. | 701/22 |
| 8,508,069 B2 | * | 8/2013 | Schaffnit | 307/10.1 |
| 8,556,760 B2 | * | 10/2013 | Mack et al. | 475/152 |
| 8,800,701 B1 | * | 8/2014 | Sadler | 180/65.31 |
| 8,827,022 B2 | * | 9/2014 | Jaberian | 180/68.5 |
| 2001/0008191 A1 | * | 7/2001 | Smith et al. | 180/65.3 |
| 2001/0015299 A1 | * | 8/2001 | Moore | 180/243 |
| 2003/0040933 A1 | * | 2/2003 | Chernoff et al. | 705/1 |
| 2003/0116374 A1 | * | 6/2003 | Chernoff et al. | 180/291 |
| 2003/0230443 A1 | * | 12/2003 | Cramer et al. | 180/65.5 |
| 2004/0012205 A1 | * | 1/2004 | Sua-An | 290/40 C |
| 2004/0020697 A1 | * | 2/2004 | Field | 180/65.2 |
| 2004/0066025 A1 | * | 4/2004 | Borroni-Bird et al. | 280/781 |
| 2004/0189054 A1 | * | 9/2004 | Chernoff et al. | 296/203.01 |
| 2005/0115748 A1 | * | 6/2005 | Lanier | 180/65.1 |
| 2006/0272863 A1 | * | 12/2006 | Donahue | 180/2.2 |
| 2007/0114080 A1 | * | 5/2007 | Kaiser et al. | 180/65.1 |
| 2007/0261902 A1 | * | 11/2007 | Margoudakis | 180/65.3 |
| 2008/0318729 A1 | * | 12/2008 | Asao et al. | 477/5 |
| 2009/0069149 A1 | * | 3/2009 | Okumura et al. | 477/28 |
| 2009/0107740 A1 | * | 4/2009 | Bell et al. | 180/65.1 |
| 2009/0145674 A1 | * | 6/2009 | Lee et al. | 180/65.1 |
| 2009/0189373 A1 | * | 7/2009 | Schramm et al. | 280/731 |
| 2009/0314019 A1 | * | 12/2009 | Fujimoto et al. | 62/228.5 |
| 2010/0019722 A1 | * | 1/2010 | Sanchez | 320/109 |
| 2010/0025131 A1 | * | 2/2010 | Gloceri et al. | 180/65.28 |
| 2010/0184560 A1 | * | 7/2010 | Campbell | 477/7 |
| 2010/0194074 A1 | * | 8/2010 | Jamieson | 280/441.2 |
| 2010/0194087 A1 | * | 8/2010 | Yamamura et al. | 280/781 |
| 2010/0217507 A1 | * | 8/2010 | Braunberger et al. | 701/112 |
| 2011/0017529 A1 | * | 1/2011 | Durney | 180/65.1 |
| 2011/0048826 A1 | * | 3/2011 | Starr | 180/65.51 |
| 2011/0048840 A1 | * | 3/2011 | Gagnon et al. | 180/446 |
| 2011/0083916 A1 | * | 4/2011 | Cimatti et al. | 180/65.22 |
| 2011/0120787 A1 | * | 5/2011 | Lee et al. | 180/65.1 |
| 2011/0172869 A1 | * | 7/2011 | Bell et al. | 701/22 |
| 2011/0218070 A1 | * | 9/2011 | Mack et al. | 475/150 |
| 2012/0041621 A1 | * | 2/2012 | Marus et al. | 701/22 |
| 2012/0129639 A1 | * | 5/2012 | Novikov | 475/5 |
| 2012/0169610 A1 | * | 7/2012 | Berkes et al. | 345/173 |
| 2012/0179334 A1 | * | 7/2012 | Gagnon et al. | 701/41 |
| 2012/0211291 A1 | * | 8/2012 | Black | 180/65.31 |
| 2012/0217339 A1 | * | 8/2012 | Gilleran et al. | 244/50 |
| 2012/0262018 A1 | * | 10/2012 | Thiara | 310/113 |
| 2013/0066492 A1 | * | 3/2013 | Holmes et al. | 701/22 |
| 2013/0119665 A1 | * | 5/2013 | Berbari | 290/50 |
| 2013/0226377 A1 | * | 8/2013 | Stanek et al. | 701/22 |
| 2013/0255214 A1 | * | 10/2013 | Nafziger et al. | 56/208 |
| 2013/0288856 A1 | * | 10/2013 | Li | 477/110 |
| 2014/0001905 A1 | * | 1/2014 | Schawitsch | 310/113 |
| 2014/0091573 A1 | * | 4/2014 | Berbari | 290/45 |

\* cited by examiner

ELECTRIC CAR SYSTEMS

CROSS-REFERENCE TO RELATED APPLICATION

The present application is related to and claims priority from prior provisional application Ser. No. 61/507,730, filed Jul. 14, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of automobiles and more specifically relates to electric cars.

DESCRIPTION OF THE RELATED ART

In modern society, automobiles with gasoline engines are used extensively to transport people back and forth to work, to get to recreation locations, and to transport supplies. Internal combustion engines are relatively inefficient at converting on-board fuel energy to propulsion as most of the energy is wasted as heat. Typically, conventional gasoline engines effectively use only 15% of the fuel energy content to move the vehicle or to power accessories, and diesel engines can reach on-board efficiencies of 20%. Although popular in use, this form of transportation due to rapidly increasing oil prices, dependence on foreign oil, vulnerability to price shocks and supply disruption, and the need to curb greenhouse gas emissions has made this an unattractive option.

Various attempts have been made to solve the above-mentioned problems such as those found in U.S. Pat. Nos. 2011/0048826; 2010/0019722; 2011/0017529; U.S. Pat. Nos. 4,438,342; 3,444,946; and 7,279,855. This art is representative of vehicles using alternative powering means. None of the above inventions and patents, taken either singly or in combination, is seen to describe the invention as claimed.

Ideally, an electric car should be user-friendly; having low operating costs and yet, would operate reliably and be manufactured at a modest expense. Thus, a need exists for a reliable electric car system to effectively eliminate the use of gas and oil for propulsion, and to avoid the above-mentioned problems.

BRIEF SUMMARY OF THE INVENTION

In view of the foregoing disadvantages inherent in the known vehicle art, the present invention provides a novel electric car system. The general purpose of the present invention, which will be described subsequently in greater detail, is to provide extended travel distances while maintaining approximately 70 miles per hour.

An embodiment of the present invention, electric powered car system is disclosed herein preferably comprising an electric powered car having a frame, the frame having a steering system, a braking system, a suspension system, and a body. The body has an an interior volume, an exterior surface with an air-intake vent, and an electronic drive system controller. The electric car drive assembly comprises at least one accessory battery, at least one drive assembly battery, at least one accessory alternator, at least one drive assembly alternator, and at least one electric drive motor.

Also preferably included in the drive assembly are at least two front axles connected to front rotatable wheels, at least one half-shaft (preferably two), and a rear axle connected to two rear rotatable wheels. The frame with the body and drive assembly is directionally controlled using the steering system. The braking system is usable to friction-slow relative movement of the electric powered car in relation to the surface it is traveling on. The suspension system supports the frame and is able to absorb shock while the electric powered car is in motion on an uneven surface. The body is affixed to the top side of the frame and has an interior volume suitable to contain an operator and the mounting for an electronic drive system controller, a steering-controller for use in manipulating the steering system, and a braking-controller for manipulating the braking system.

The exterior surface of the body creates an envelope to protect the operator and other occupants from the elements, and has at least one window suitable for an operator to see the environment surrounding the electric powered car so that the car can be suitably controlled while it is in motion. The drive assembly is preferably mounted substantially within the confines of the frame.

The accessory battery of the drive assembly is useable to electrically power at least one accessory within the electric powered car and is useable to provide redundant electricity to the drive assembly battery when needed. The drive assembly battery is useable to provide electricity to power the electric drive motor and the accessory alternator uses the rotational motion of the electric drive motor to generate electricity for recharging the accessory battery in preferred embodiments. The drive assembly alternator uses the rotational motion of the electric drive motor to generate electricity for recharging the drive assembly battery.

The electric drive motor provides torque to two half shafts, each of which are usable to exert a drive-motion to each of the two front axles that are connected to the front rotatable wheels. The rear axle preferably comprises a straight axle connected to the two rear rotatable wheels and the two front axles are connected to the front rotatable wheels which support the frame of the electric powered car and also are part of the drive and steering systems. The electric powered car system is usable for an operator to travel from one location to another at speeds of up to about 70 miles per hour. The electric powered car system is usable for an operator to travel from one location to another on a road at a highway speed of about 70 miles per hour for an extended time due to constant recharging of the batteries. It should be appreciated that the batteries may need to be charged and/or maintained appropriately and that battery replacement may occur as needed.

In preferred embodiments the electric powered car has a belly pan which protects the electric drive motor and electrical components from water splashing upward from underneath the electric powered car when the electric powered car is in motion. The belly pan may be made of fiberglass but in some embodiments may be aluminum. The air-intake vent located on (or in) the exterior surface of the body allows cool air to flow to, contact and cool the electric drive motor.

The accessory alternator is designed to provide the electricity necessary for lighting and running an air conditioning fan and heating accessories. An air conditioning compressor may be in a coupled relationship to a main shaft of the electric drive motor. The electronic drive system controller preferably comprises a touch-screen for selecting a forward direction, a reverse direction, a neutral position, and/or at least one security movement lock position. When the electronic drive system controller is in a security movement lock position, the braking system may be frictionally actuated such that movement is thereby restricted.

In preferred embodiments the accessory battery(s) voltage and the drive assembly battery(s) may be between about 12 volts direct current and about 48 volts direct current. The electric drive motor is preferably coupled in a direct drive relationship with the front rotatable wheels and may be a single phase motor but in some embodiments may be a 3 phase motor, and the electric drive motor may be coupled to a 2 speed transmission.

The electric powered car system may comprise a kit as described herein including an electronic drive system controller, at least one replacement accessory battery, at least one replacement drive assembly battery, and a set of user operating/maintaining instructions.

A method of using an electric powered car system may comprise the steps of: entering the electric powered car; releasing a security movement lock; manipulating a touch screen pad to select a forward or a reverse position; driving the electric powered car at a speed of up to 70 miles an hour; stopping the electric powered car; activating the security movement lock; and exiting the electric powered car.

The present invention holds significant improvements and serves as an electric car system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, electric powered car systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to electric transportation systems and more particularly to an electric car system as used to reduce transportation costs and dependence on petroleum products.

Figure 1:
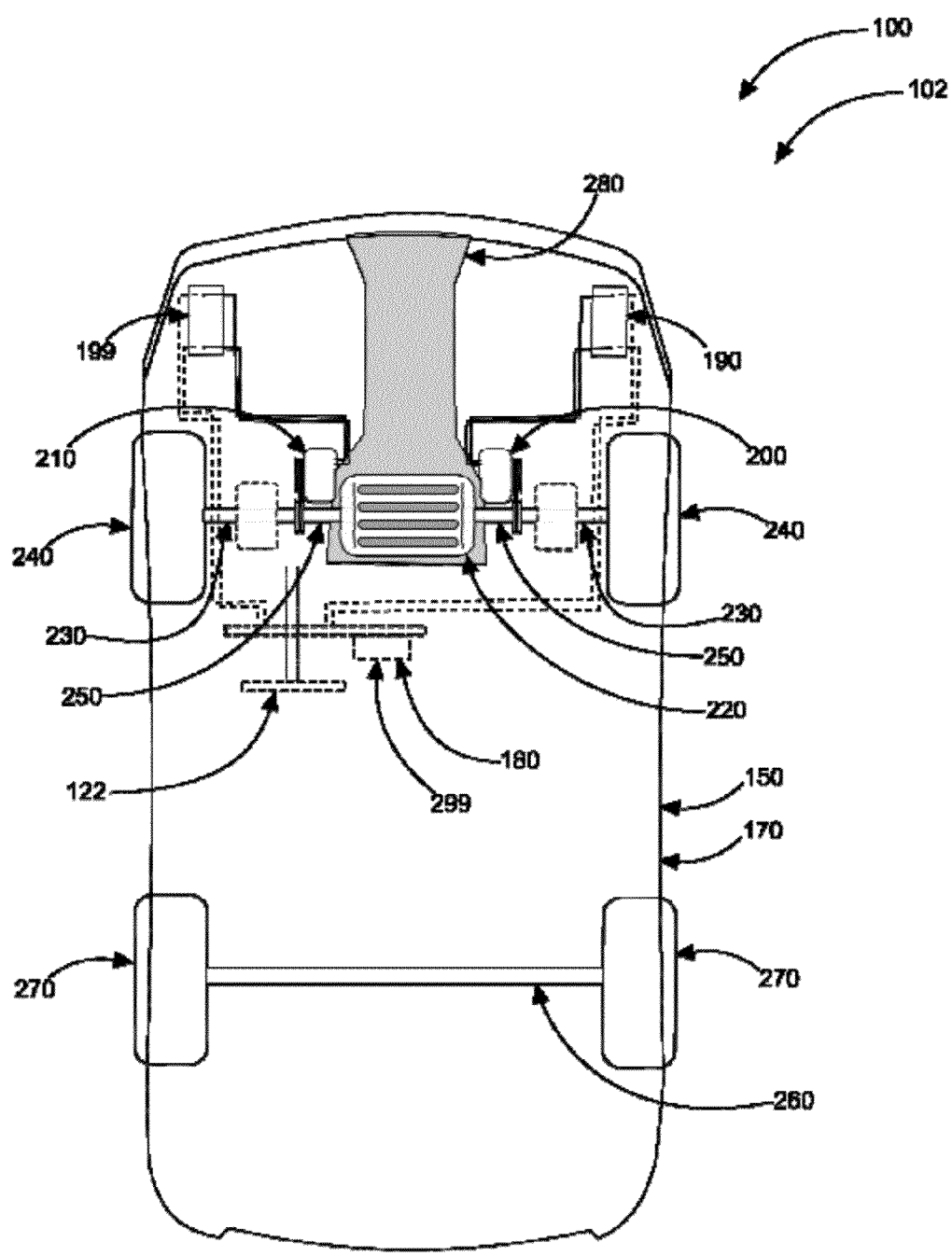
FIG. 1 shows a perspective view illustrating an electric powered car system according to an embodiment of the present invention.

Referring to the drawings by numerals of reference there is shown in FIG. 1, a perspective view illustrating electric powered car system 100 according to an embodiment of the present invention.

Electric powered car system 100 comprises electric powered car 102 preferably having frame 110; frame 110 comprising steering system 120, braking system 130, and suspension system 140. Body 150 of electric powered car 102 comprises interior volume 160, exterior surface 170, and electronic drive system controller 180. Electronic drive system controller 180 is preferably in communication with the drive assembly comprising at least one accessory battery 190, at least one drive assembly battery 199, at least one accessory alternator 200, at least one drive assembly alternator 210, at least one electric drive motor 220, at least two front axles 230 connected to front rotatable wheels 240, at least one half shaft 250, and rear axle 260 connected to two rear rotatable wheels 270.

Frame 110 of body 150 and the drive assembly is directionally controlled using steering system 120; wherein braking system 130 is usable to friction-slow relative movement of electric powered car 102, stop electric powered car 102 in traffic, or lock rotational movement of front rotatable wheels 240 and/or rear rotatable wheels 270 of electric powered car 102 when parked. The drive assembly is preferably mounted in frame 110. Suspension system 140 supports frame 110 such that suspension system 140 is able to absorb shock while electric powered car 102 is in motion on an uneven surface or substantially even surface such as a road.

Body 150 is preferably affixed to top side of frame 110 and substantially envelopes frame 110 (from the top side.) Body 150 comprises interior volume 160 suitable to contain an operator and at least one passenger. Body 150 also serves as mounting means for electronic drive system controller 180, steering-controller 122 for use in manipulating steering system 120, and a braking-controller 132 for manipulating braking system 130 for use by the operator. Exterior surface 170 of body 150 comprises a vehicle shell (at least herein embodying envelope) and at least one window (windshield, side windows, rear windows preferably) such that operator can see an environment surrounding electric powered car 102 such as to suitably control electric powered car 102 when in motion.

Accessory battery 190 of the drive assembly is useable to electrically power at least one accessory within electric powered car 102 and is useable to provide redundant electricity to assist assembly battery 199. Drive assembly battery 199 is useable to provide electricity to power electric drive motor 220. Accessory alternator 200 and drive assembly alternator 210 uses a rotational motion of electric drive motor 220 to generate electricity for recharging accessory battery 190 and drive assembly battery 199.

Electric drive motor 220 provides necessary torque to half shaft(s) 250, each usable to exert a drive-motion (rotational) to each of two front axles 230 connected to front rotatable wheels 240. Rear axle 260 is connected to two rear rotatable wheels 270 and two front axles 230 are connected to front rotatable wheels 240 and support frame 110 of electric powered car 102. Electric powered car system 100 is usable for an operator to travel from one location to another on a road at a suitable highway speed. It is envisioned that the vehicle may be preferably front-wheel drive; however alternate embodiments may comprise rear-wheel versions.

Figure 2:
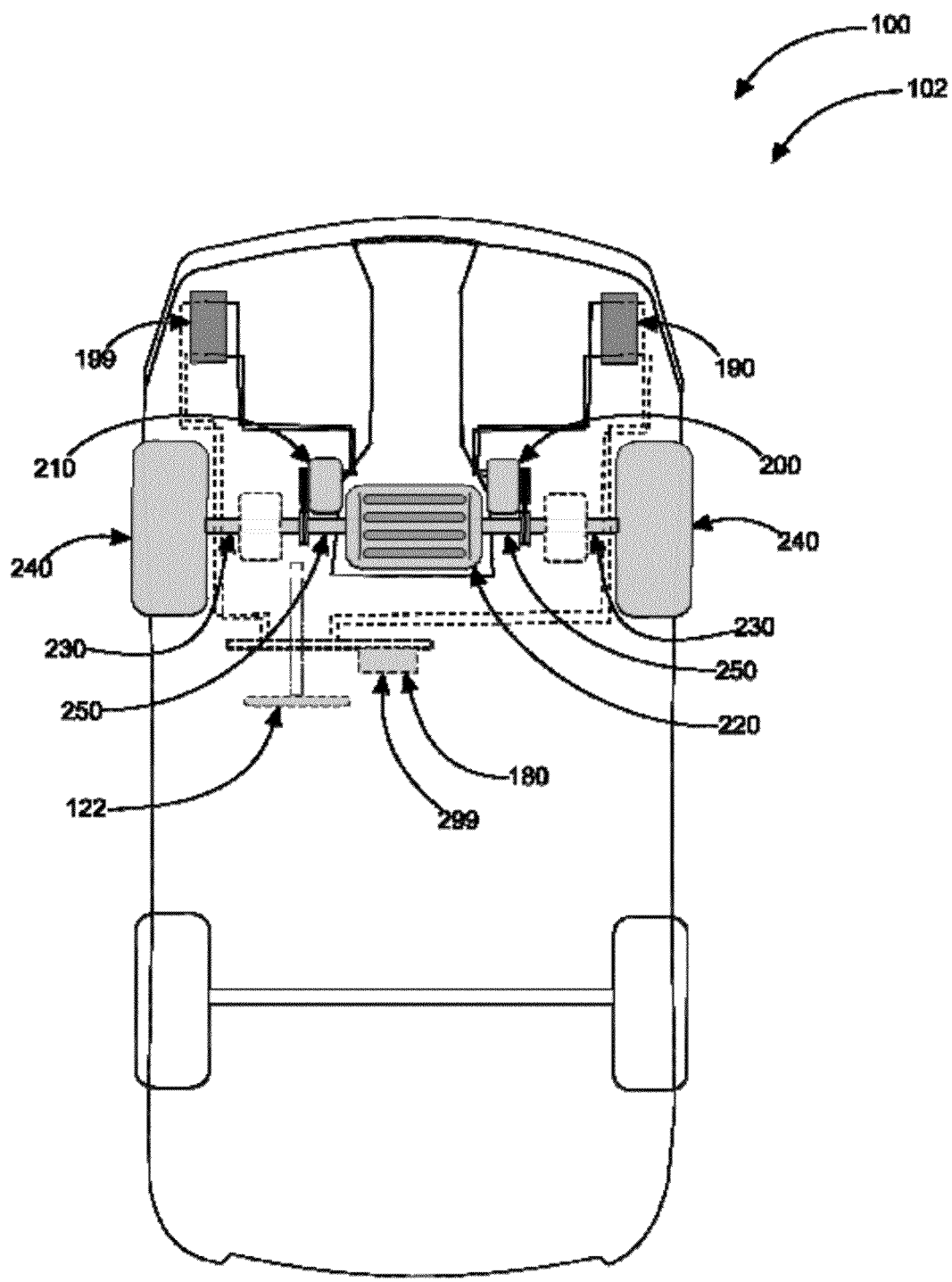
FIG. 2 is a perspective view illustrating the electric drive motor and drive train configuration of an electric powered car according to an embodiment of the present invention of FIG. 1.

Referring now to FIG. 2, a perspective view illustrating electric drive motor 220 and drive train configuration of electric powered car 102 according to an embodiment of the present invention of FIG. 1.

Body 150 in a preferred embodiment comprises an air-intake vent 280 such that air entering air-intake vent 280 is able to flow into the engine compartment to cool electric drive motor 220. In this way drive motor 220 is able to run cooler and more efficiency. When electronic drive system controller 180 is in the security movement lock position, the electrical system of electric powered car 102 is disconnected from electric drive motor 220. Electric drive motor 220 may be coupled in a direct drive relationship with front rotatable wheels 240 via half shaft(s) 250 (or other suitable equivalent) or in some embodiments, electric drive motor 220 may be coupled to at least a 2 speed transmission providing gear reduction and/or increase to allow for a wider range of travelling speeds. Electric powered car 102 is able to travel at about 70 miles per hour for at least one hour within preferred embodiments as mentioned previously. Electric drive motor 220 may be a single phase motor, but in some embodiments, may be a 3-phase motor.

Figure 3:
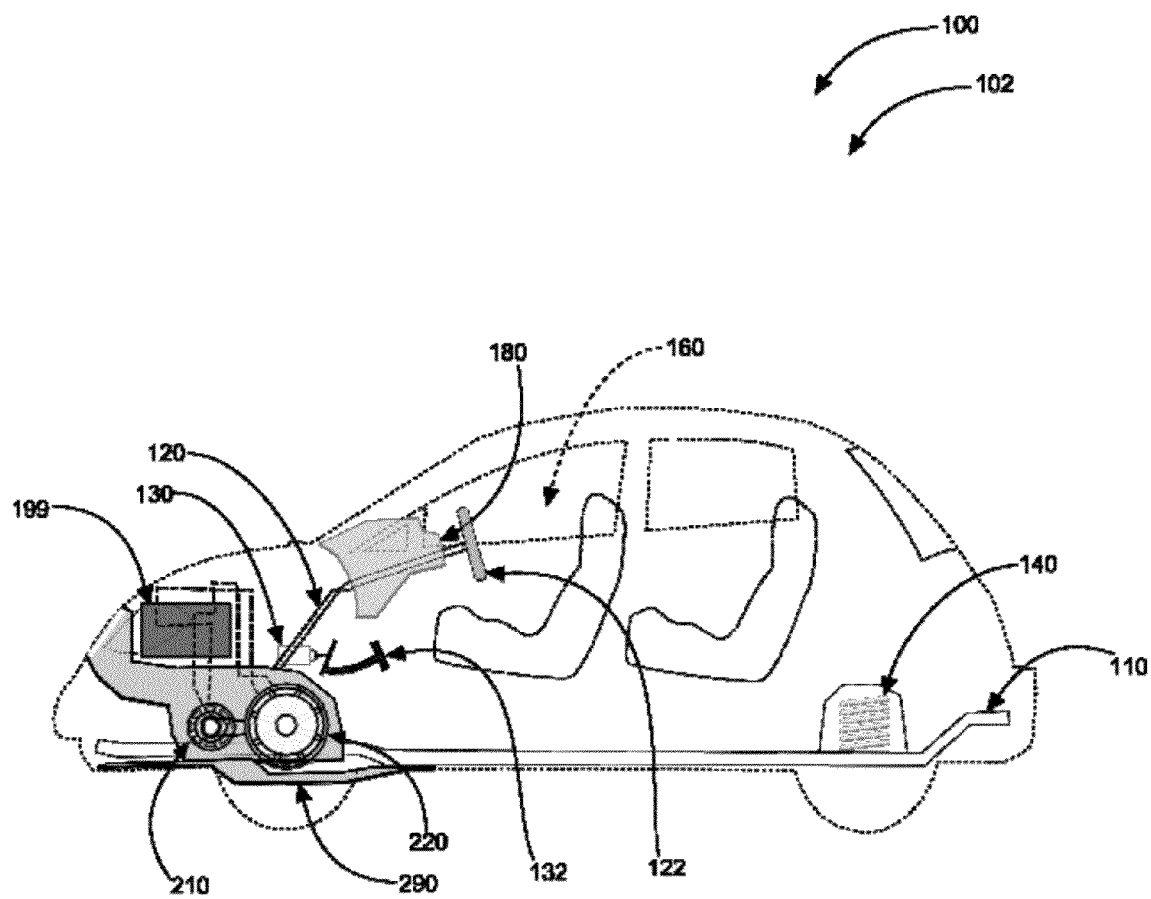
FIG. 3 is a perspective view illustrating features of the electric powered car system according to an embodiment of the present invention of FIG. 1.

Referring now to FIG. 3, a perspective view illustrating features of electric powered car 102 according to an embodiment of the present invention of FIG. 1.

Electric powered car 102 in preferred embodiments preferably comprises belly pan 290 attached to frame 110 such that electric drive motor 220 is substantially protected from water splashing upwardly from underneath electric powered car 102 when electric powered car 102 is in motion. Belly pan 290 may be constructed of fiberglass but in some embodiments may be aluminum or a thin gauge ferrous metal for weight reduction of electric powered car 102. Electric powered car 102 may further comprise an air conditioning compressor which is in a coupled relationship to electric drive motor 220 to provide air conditioning to occupant(s). Electronic drive system controller 180 may comprise a touch-screen pad 299 located within interior volume 160 of body 150 within reach-proximity to operator. Touch-screen pad 299 (or other suitable equivalent) is able to be manipulated for selecting a forward direction, a reverse direction, a neutral position, or a security movement lock position. When electronic drive system controller 180 is in a security movement lock position, braking system 130 is frictionally actuated.

Figure 4:
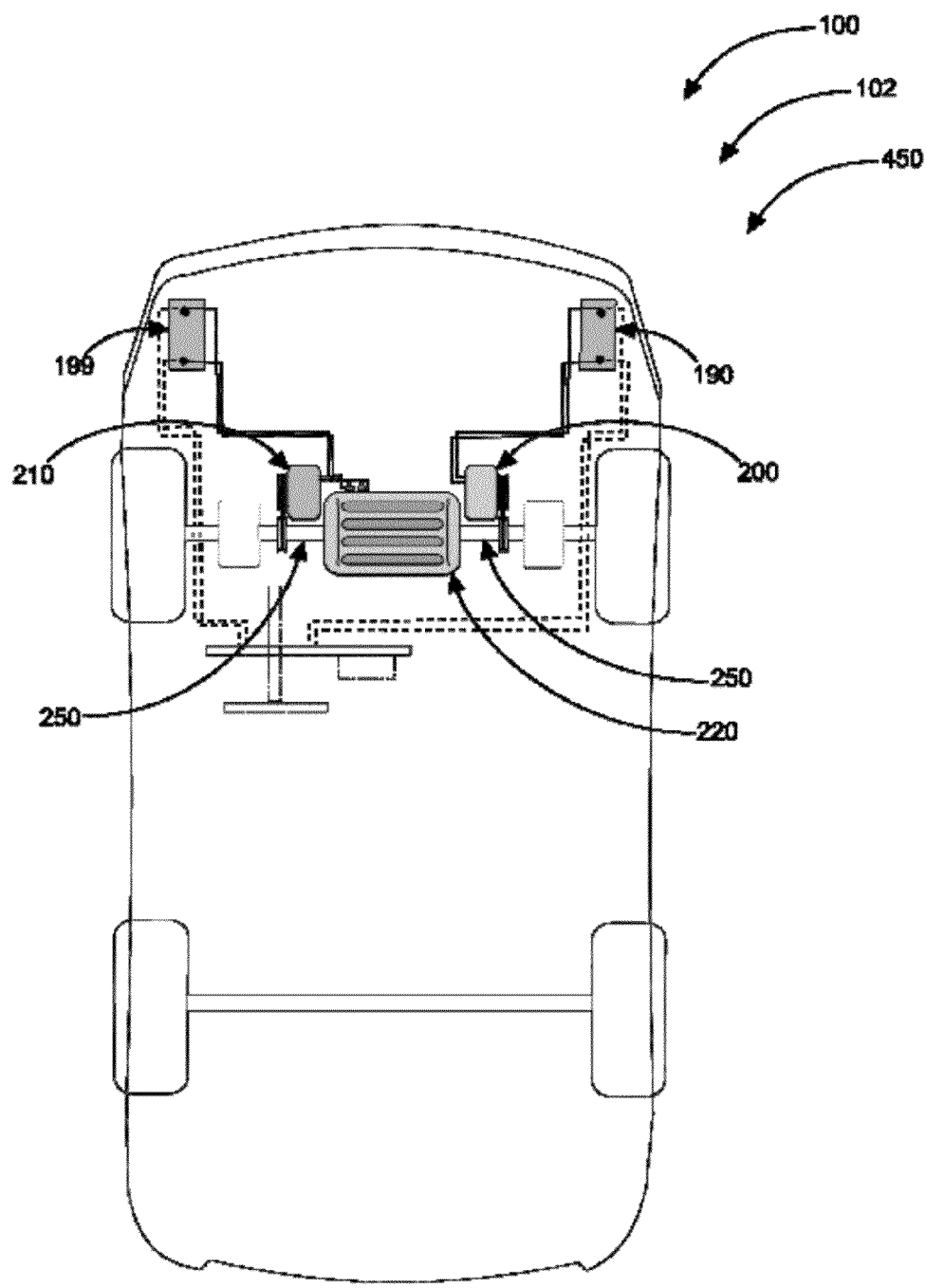
FIG. 4 is a perspective view illustrating the charging and power storage systems of an electric powered car according to an embodiment of the present invention of FIG. 1.

Referring now to FIG. 4, a perspective view illustrating the charging and power storage system of electric powered car 102 according to an embodiment of the present invention of FIG. 1.

Accessory alternator 200 provides electricity for illuminating lights (interior and exterior), running at least one air conditioning fan, heating accessor(ies), and other dashboard accessories. Accessory battery 190 may comprise a voltage of between about 12 volts direct current and about 48 volts direct current and comprises a deep-cycle-battery in preferred embodiments. Electric powered car 102 comprises at least one drive assembly battery 199 having a voltage of between about 12 volts direct current and about 48 volts direct current and comprises a deep-cycle-battery. It should be appreciated that other voltage batteries may be used and still be considered within the scope of the present invention.

Electric powered car system 100 according to an embodiment of the present invention of FIGS. 1-4, may be sold as kit 450 comprising the following parts: at least one electric powered car 102 equipped with electronic drive system controller 180; at least one replacement accessory battery 190; at least one replacement drive assembly battery 199; and at least one set of user instructions. Electric powered car system 100 may be manufactured and provided for sale in a wide variety of sizes, models and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different option combinations, different battery combinations, parts may be sold separately, etc., may be sufficient. Additionally, the present powering means may be incorporated into other vehicles such as motorcycles, trucks, buses, non-land vehicles, tracked vehicles, equipment and the like.

Figure 5:
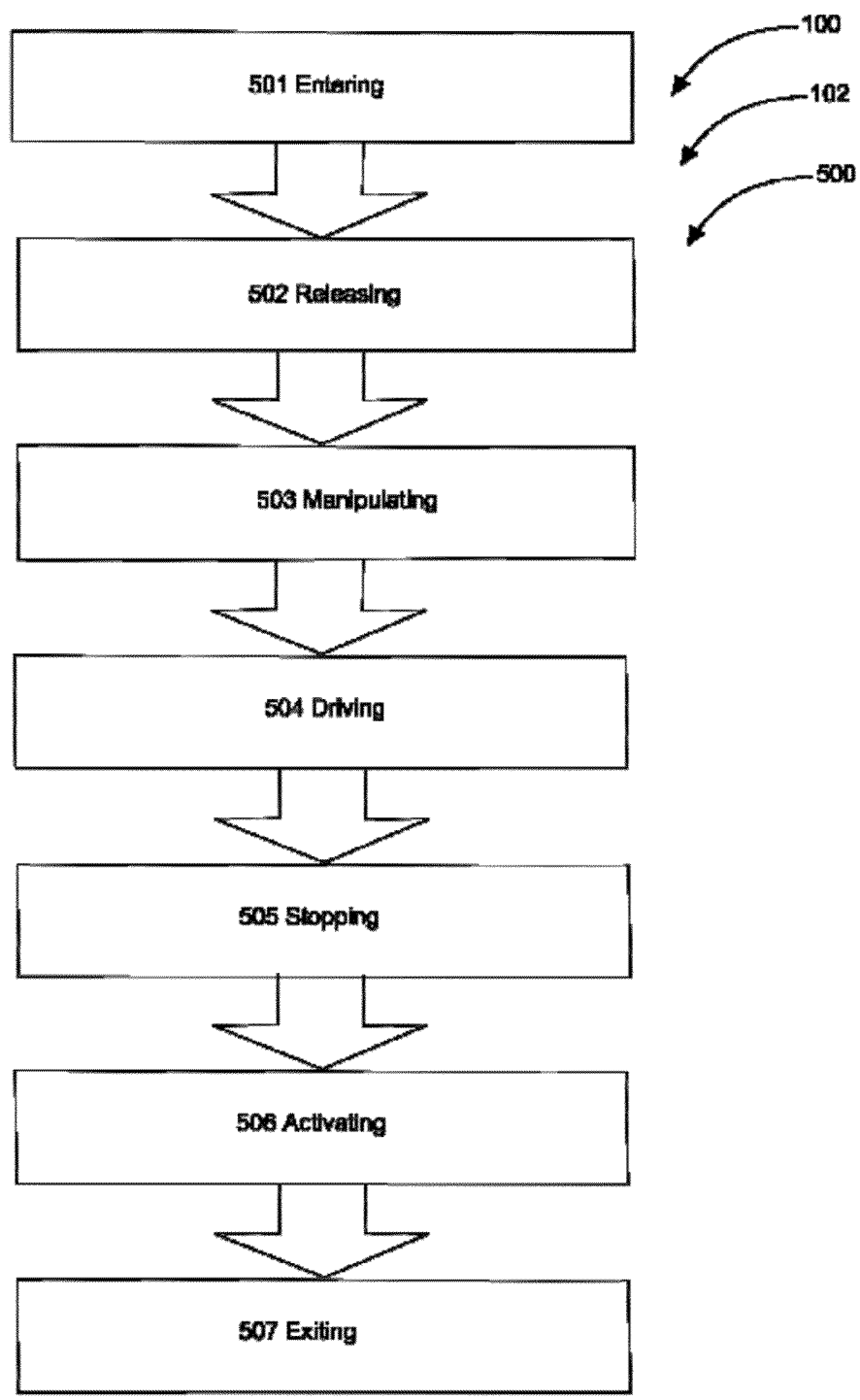
FIG. 5 is a flowchart illustrating a method of use of the electric car system according to an embodiment of the present invention of FIGS. 1-4.

Referring now to FIG. 5, showing a flowchart illustrating method of use 500 for electric powered car system 100 according to an embodiment of the present invention of FIGS. 1-4.

Method of use 500 for electric powered car system 100 may comprise the steps of: step one 501 entering electric powered car 102; step two 502 releasing a security movement lock; step three 503 manipulating touch-screen pad 299 to select a forward or a reverse (or neutral, park or the like) position; step four 504 driving electric powered car 102 at about 70 miles an hour (more or less); step five 505 stopping electric powered car 102; step six 506 activating security movement lock; and step seven 507 exiting electric powered car 102. Other steps may comprise charging batteries, starting and/or stopping electric drive motor 220.

It should be noted that step 506 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An electric powered car comprising:
   a) an electric powered car having,
      i) a frame comprising;
         (1) a steering system;
         (2) a braking system;
         (3) a suspension system;
      ii) a body comprising;
         (1) an interior volume;
         (2) an exterior surface; and
         (3) an electronic drive system controller;
      iii) a drive assembly comprising;
         (1) an accessory battery;
         (2) a drive assembly battery;
         (3) an accessory alternator;
         (4) a drive assembly alternator;
         (5) at least one electric drive motor;
         (6) at least two front axles connected to front rotatable wheels;
         (7) at least one half shaft; and
         (8) a rear axle connected to two rear rotatable wheels;
   b) wherein said frame with said body and said drive assembly is directionally controlled using said steering system;
   c) wherein said braking system is usable to friction-slow relative movement of said electric powered car;
   d) wherein said suspension system supports said frame such that said suspension system is able to absorb shock while said electric powered car is in motion on an uneven surface;
   e) wherein said body is affixed to a top side of said frame;
   f) wherein said body comprises said interior volume suitable to contain an operator and mounting for said electronic drive system controller, and a steering-controller for use in manipulating said steering system, and a braking-controller for manipulating said braking system for use by said operator;
   g) wherein said exterior surface of said body comprises an envelope and at least one window such that said operator can see an environment surrounding said electric powered car such as to suitably control said electric powered car;
   h) wherein said drive assembly is mounted to said frame;
   i) wherein said accessory battery of said drive assembly is useable to electrically power at least one accessory within said electric powered car and is useable to provide redundant electricity to said drive assembly battery;
   j) wherein said drive assembly battery is useable to provide electricity to power said at least one electric drive motor;
   k) wherein said accessory alternator uses a rotational motion of said at least one electric drive motor to generate said electricity for recharging said accessory battery;
   l) wherein said drive assembly alternator uses said rotational motion of said at least one electric drive motor to generate said electricity for recharging said drive assembly battery;
   m) wherein said at least one electric drive motor provides a torque to said at least one half shaft, each usable to exert a drive-motion to each of said two front axles connected to said front rotatable wheels;
   n) wherein said rear axle connected to said two rear rotatable wheels and said two front axles connected to said front rotatable wheels support said frame of said electric powered car;
   o) wherein said electric powered car system is usable for said operator to travel from one location to another on a road at a highway speed;
   p) wherein said body comprises an air-intake vent such that air entering said air-intake vent cools said at least one electric drive motor;
   q) wherein said accessory alternator is positioned to one side of said at least one electric drive motor and said air-intake vent, and said drive assembly alternator is positioned on an opposing side of said at least one electric drive motor and air-intake vent; and
   r) wherein said accessory alternator and said drive assembly alternator are positioned forward of said at least two front axles in a vehicle longitudinal direction.

2. The electric powered car system of claim 1 wherein said electric powered car comprises a belly pan attached to said frame such that said at least one electric drive motor is substantially protected from water splashing upward from underneath said electric powered car when said electric powered car is in motion.

3. The electric powered car system of claim 2 wherein said belly pan comprises fiberglass.

4. The electric powered car system of claim 2 wherein said belly pan comprises aluminum.

5. The electric powered car system of claim 1 wherein said accessory alternator provides said electricity for illuminating lights, and running at least one air conditioning fan, and heating accessor(ies).

6. The electric powered car system of claim 1 further comprising an air conditioning compressor which is in a coupled relationship to said at least one electric drive motor.

7. The electric powered car system of claim 1 wherein said electronic drive system controller comprises a touch-screen pad located within said interior volume of said body within reach-proximity to said operator, said touch-screen pad is able to be manipulated for selecting a forward direction, a reverse direction, a neutral position, or a security movement lock position.

8. The electric powered car system of claim 7 wherein when said electronic drive system controller is in a security movement lock position, said braking system is frictionally actuated.

9. The electric powered car system of claim 7 wherein when said electronic drive system controller is in a security movement lock position, said electronic drive system controller of said electric powered car is disconnected from said at least one electric drive motor.

10. The electric powered car system of claim 1 wherein said accessory battery comprises a voltage of between about 12 volts direct current and about 48 volts direct current and comprises a deep-cycle-battery.

11. The electric powered car system of claim 1 wherein said at least one drive assembly battery comprises a voltage of between about 12 volts direct current and about 48 volts direct current and comprises a deep-cycle-battery.

12. The electric powered car system of claim 1 wherein said at least one electric drive motor is coupled in a direct drive relationship with said front rotatable wheels via said at least one half shaft.

13. The electric powered car system of claim 11 wherein said at least one electric drive motor is couplable to a 2 speed transmission.

14. The electric powered car system of claim 13 wherein said electric powered car is able to travel at about 70 miles per hour for at least one hour.

15. The electric powered car system of claim 1 wherein said at least one electric drive motor is a single phase motor.

16. The electric powered car system of claim 1 wherein said at least one electric drive motor is a 3-phase motor.

17. An electric powered car comprising:
  a) an electric powered car having,
  b) a frame comprising:
    i) a steering system;
    ii) a braking system;
    iii) a suspension system;
  c) a body comprising:
    i) an interior volume;
    ii) an exterior surface with an air-intake vent; and
    iii) an electronic drive system controller;
  d) a drive assembly comprising:
    i) an accessory battery;
    ii) a drive assembly battery;
    iii) an accessory alternator;
    iv) a drive assembly alternator;
    v) at least one electric drive motor;
    vi) at least two front axles connected to front rotatable wheels;
    vii) at least one half shaft; and
    viii) a rear axle connected to two rear rotatable wheels;
  e) wherein said frame with said body and said drive assembly is directionally
  f) controlled using said steering system;
  g) wherein said braking system is usable to friction-slow relative movement of said electric powered car;
  h) wherein said suspension system supports said frame such that said suspension system is able to absorb shock while said electric powered car is in motion on an uneven surface;
  i) wherein said body is affixed to a top side of said frame;
  j) wherein said body comprises said interior volume suitable to contain an operator, mounting for said electronic drive system controller, a steering-controller for use in manipulating said steering system, and a braking-controller for manipulating said braking system for use by said operator;
  k) wherein said exterior surface of said body comprises an envelope and at least one window such that said operator can see an environment surrounding said electric powered car such as to control said electric powered car while in motion;
  l) wherein said drive assembly is mounted substantially within confines of said frame;
  m) wherein said accessory battery of said drive assembly is useable to electrically power at least one accessory within said electric powered car and is useable to provide redundant electricity to said drive assembly battery;
  n) wherein said drive assembly battery is useable to provide electricity to power said at least one electric drive motor;
  o) wherein said accessory alternator uses a rotational motion of said at least one electric drive motor to generate said electricity for recharging said accessory battery;
  p) wherein said drive assembly alternator uses said rotational motion of said at least one electric drive motor to generate said electricity for recharging said drive assembly battery;
  q) wherein said at least one electric drive motor provides a torque to said at least one half shaft, each of said at least one half shaft usable to exert a drive-motion to each of said two front axles connected to said front rotatable wheels;
  r) wherein said rear axle connected to said two rear rotatable wheels and said two front axles connected to said front rotatable wheels support said frame of said electric powered car;
  s) wherein said electric powered car system is usable for said operator to travel from one location to another;
  t) wherein said electric powered car comprises a belly pan such that said at least one electric drive motor is protected from water splashing upwardly from underneath said electric powered car when said electric powered car is in motion;
  u) wherein said belly pan comprises fiberglass;
  v) wherein said air-intake vent allows cool air to contact and cool said at least one electric drive motor;
  w) wherein said accessory alternator provides said electricity necessary for lighting, and running an air conditioning fan and heating accessories;
  x) wherein an air conditioning compressor is in a coupled relationship to a main shaft of said electric drive motor;
  y) wherein said electronic drive system controller comprises a touch-screen for selecting a forward direction, a reverse direction, a neutral position, and at least one security movement lock position;
  z) wherein when said electronic drive system controller is in a security movement lock position, said braking system is frictionally actuated;
  aa) wherein said accessory battery comprises a voltage of between about 12 volts direct current and about 48 volts direct current;
  bb) wherein said drive assembly battery comprises a voltage of between about 12 volts direct current and about 48 volts direct current;
  cc) wherein said at least one electric drive motor is coupled in a direct drive relationship with said front rotatable wheels;
  dd) wherein said at least one electric drive motor is a single phase motor;
  ee) wherein said at least one electric drive motor is coupled to a 2 speed transmission;
  ff) wherein said electric powered car system is usable for said operator to travel from one location to another on a road at a highway speed of about 70 miles per hour;
  gg) wherein said accessory alternator is positioned to one side of said at least one electric drive motor and said air-intake vent, and said drive assembly alternator is positioned on an opposing side of said at least one electric drive motor and air-intake vent; and r) wherein said accessory alternator and said drive assembly alternator are positioned forward of said at least two front axles in a vehicle longitudinal direction.

18. The electric powered car system of claim 17 further comprising a kit including:
  a) said electric powered car equipped with said electronic drive system controller;
  b) at least one replacement said accessory battery;
  c) at least one replacement said drive assembly battery; and
  d) a set of user instructions.

* * * * *